United States Patent

Neugroschl

[15] 3,659,974
[45] May 2, 1972

[54] TIRE CURING APPARATUS MONITORING AND CONTROL

[72] Inventor: Ernst J. Neugroschl, Akron, Ohio
[73] Assignee: The Goodyear Tire & Rubber Company, Akron, Ohio
[22] Filed: Aug. 6, 1968
[21] Appl. No.: 750,512

[52] U.S. Cl. ..............................425/29, 18/2 HA, 77/32.1, 90/13.5, 264/40, 425/34, 425/32, 425/44, 425/38, 425/135, 425/163
[51] Int. Cl. .....................................B29h 5/00, B29h 17/00
[58] Field of Search...................18/2 TP, 2 I; 77/17 C, 17 W, 77/17 K, 32.1; 90/13.5

[56] References Cited

UNITED STATES PATENTS

| | | | |
|---|---|---|---|
| 2,820,937 | 1/1958 | Fogiel | 18/2 I UX |
| 2,938,100 | 5/1960 | Gibbs | 18/17 C UX |
| 2,946,088 | 7/1960 | Soderquist | 18/17 W X |
| 3,097,394 | 7/1963 | Mallory et al. | 18/2 TP X |
| 3,170,187 | 2/1965 | Brundage | 18/2 TP |
| 3,173,315 | 3/1965 | Fuldner | 77/32.1 |
| 3,211,896 | 10/1965 | Evans et al. | 77/32.1 UX |
| 3,230,836 | 1/1966 | Fengler | 90/13.5 |
| 3,222,724 | 12/1965 | Soderquist | 18/17 |
| 3,339,227 | 9/1967 | Ehrenfreund | 18/2 |
| 3,401,425 | 9/1968 | Fink | 18/17 |
| 3,461,502 | 8/1969 | Turk et al. | 18/17 K |
| 3,495,296 | 2/1970 | Ericson et al. | 18/2 TP |

*Primary Examiner*—J. Howard Flint, Jr.
*Attorney*—Beveridge & De Grandi

[57] ABSTRACT

In the process of molding and curing pneumatic tires, this invention senses certain selected quantities (e.g., cure cycle length) in the tire press and, in some applications, a post cure inflator, and feeds the sensed signals to a digital computer. The computer scans the input and compares it with pre-stored ideal values. If the sensed data differs from the stored values by too great a degree, the computer provides an appropriate output. Further, the computer may control a tire marker to mark those tires which fail the comparison. In addition, by feeding information to the computer from a plurality of presses, accurate inventory counts, production requirements, production and press break-down history, and so forth, may be maintained automatically.

2 Claims, 3 Drawing Figures

Patented May 2, 1972

INVENTOR

ERNST J. NEUGROSCHL

BY Browne, Schuyler & Beveridge

ATTORNEYS

Patented May 2, 1972

INVENTOR
ERNST J. NEUGROSCHL

BY Browne, Schuyler & Beveridge
ATTORNEYS

TIRE CURING APPARATUS MONITORING AND CONTROL

This invention relates to a device for monitoring input, operation and output of pneumatic tire molding and curing apparatus.

Modern tire plants contain a multitude of tire presses, each press capable of molding and curing (vulcanizing) as many as two tires every 15 to 20 minutes. In view of the increasing number of tire brands which must be produced in a large variety of tire sizes, the task of quality control, production scheduling, inventory control, maintenance, and so forth, have become most difficult. Further, the high cost of tire press equipment requires high utilization of such equipment to make most efficient use of total press capacity.

In older tire plants, counters, recorders and apparatus gauges are located at each tire press where they must be visually monitored. Since supervision and collection of data from individual counters is cumbersome and inefficient, a press malfunction or break-down is not detected immediately. The consequence is slowed production and inefficient use of total press capacity.

In newer plants, there has been a tendency to centralize counters and some recorders or gauges of at least sections of presses or of some selected variables in central control rooms. While this expediency speeds production monitoring, it still lags far behind the ideal.

In this invention, a apparatus is provided whereby sensors located at each press are connected at a central point to the input of a data processing system. A digital computer repetitively scans the input terminals to monitor the operation of each press. Counts of uncured tires fed to the presses are kept; steps in the molding and curing process are monitored for quality control by comparing the sensed parameters against pre-determined stored acceptable ranges of values; cured tires may be marked according to quality at the output of each press; and, accurate production reports, machine malfunction reports, and so forth, are maintained. All outputs of this apparatus are available immediately to supervisory personnel.

It is therefore an object of this invention to provide a apparatus for automatically monitoring and checking the operation of tire molding and curing apparatus.

It is another object of this invention to provide counts of numbers of uncured tires fed into plant presses.

It is a further object of this invention to provide an inventory of tires molded and cured.

It is still another object of this invention to automatically compare ideal data against sensed data and provide exception messages when the comparison shows too great a departure from ideal values.

It is a still further object of this invention to mark tires as they leave the presses with quality marks determined by the automatic comparisons.

It is a further object of this invention to provide a apparatus which will make all the necessary production and quality control information available upon demand.

These and other objects of this invention will become readily apparent by reference to the following specification and drawings, wherein.

This specification will set forth only information sufficient to understand the combination of the invention. It is not intended that this invention be limited to any single type or brand of tire press or post cure inflator. To the extent such devices differ slightly between manufacturers, a person skilled in this art could make the necessary modifications in this invention without departing from the scope thereof.

In the manufacturing of pneumatic tires, the components are assembled into uncured tires. Both bias ply uncured tires and radial ply uncured tires are placed automatically into the lower cavity of a tire press. As the upper cavity is lowered, an inflatable rubber bladder, or other means, is used to inflate the uncured tire, forcing it outwardly against the mold. When the upper cavity is completely lowered and the mold is closed, the bladder or other means presses the tire against the mold on all sides, and the tire takes on the tread design and markings carried by the mold.

Pressurized heated steam or other agent inflates the bladder or other means and heat is applied to the mold to cure the tire. In a typical passenger car tire, for example, steam at a first pressure of approximately 100 p.s.i. and then approximately 200 p.s.i. and a temperature of approximately 300° F. is used to inflate the bladder. Curing time varies, depending upon the tire design and rubber compound, from 15 to 20 minutes in the case of the example tire above, to several hours in large earth-mover tires.

As is well known, many tire curing processes include, subsequent to the molding of the tire in the press, a post cure inflation operation which comprises inflating the tire with air to a pressure which may be in the range of normal inflation pressure for the tire and permitting the tire to cool while so inflated. Generally the length of the post cure inflation cycle is twice the length of the cure cycle.

Use of the phrase "tire molding and curing apparatus" in the specification and claims herein is intended to encompass both a tire press alone and in combination with a post cure inflator.

It must be stressed that while ranges of time, temperature and pressure have been given, the value of each for any one tire is quite narrow. Each parameter is determined by the tire design and particular rubber compound used. Even slight variations from the prescribed parameters can result in a low grade tire. Further large variation may result in the necessity of the tire being scrapped.

Figure 1:
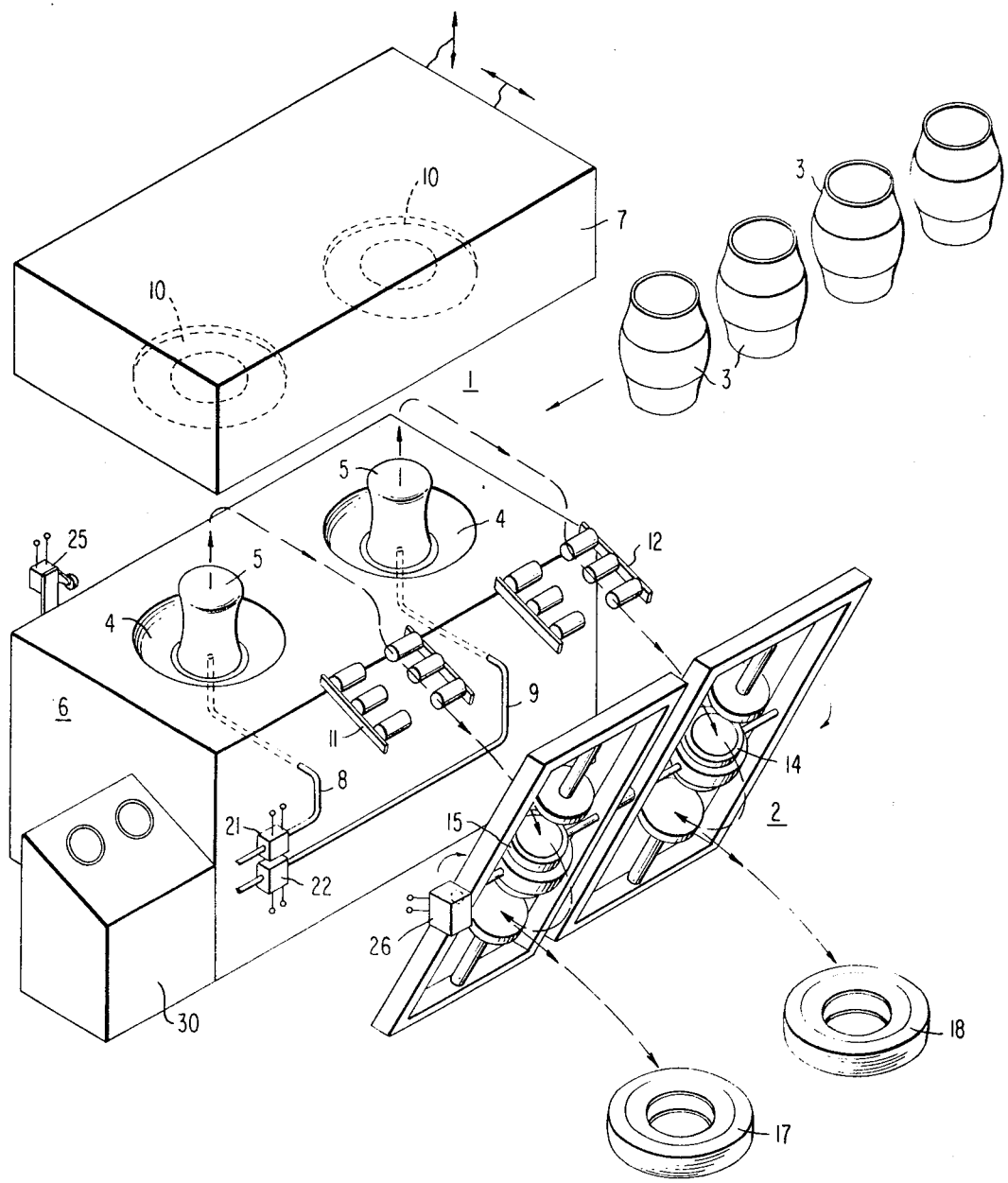
FIG. 1 is a generalized illustration of a tire press and post cure inflator.

Referring to FIG. 1, a generalized tire press 1 and post cure inflator 2 is illustrated. Uncured tires 3 are fed two at a time by automatic equipment (not shown) into lower cavities 4 of lower half 6 of the tire press. The uncured tires 3 are placed in the cavities around inflatable curing bladders 5.

After the uncured tires are positioned around the bladders in lower cavities 4, the upper half 7 of the tire press closes downwardly. As the press closes, steam lines 8, 9 deliver heated high pressure steam to the curing bladders, causing them to expand and mold the uncured tires against upper and lower cavities 10, 4 of the tire press. By regulation of steam pressure and temperature by means of a timing device (not shown), the proper heat is delivered to the curing tires.

After the prescribed curing time is completed, upper press half 7 raises, ejecting the hot tires onto delivery rollers 11, 12. If the tires are to undergo post cure inflation, they are mounted on the upper side of mandrels 14, 15 by automatic devices (not shown) and air inflated as described above.

The length of the curing cycle and the sequence and values of temperature and pressure are critical in the production of tires. Undercure results in insufficient molecular cross-ties, producing a weak rubber. If the rubber is overcured, the rubber is excessively cross-tied, generally producing an inelastic, brittle rubber.

When post cure inflation is utilized, the time interval between ejection of the tire from press 1 and mounting and inflation on post cure inflator 2 is critical. Depending upon tire type and rubber compound, the time interval will fall in the range of 20 to 120 seconds.

At the same time a pair of tires is ejected from the press and mounted on post cure inflator 2, a further pair of uncured tires is automatically loaded into the press. Since press cure time is approximately one-half post cure time, the second pair of tires is ready for ejection half way through the post cure cycle of the first pair. As the second pair is ejected onto delivery rollers 11, 12, post cure inflator 2 is turned over, so that the second tire pair may be rimmed and inflated on the side of mandrels 14, 15 opposite the first pair. When a third tire pair is ejected from press 1, the post cure cycle of the first tire pair is completed and they are ejected as finished tires 17 and 18. The post cure inflator then turns over so that the third tire pair may be rimmed and inflated in the empty positions.

Parameters of the curing process are detected according to this invention by electrical sensors. Inflation of bladders 5 is detected by pressure switches 21, 22 which are of conventional design. The pressure at which switches 21, 22 operate may be varied, but they must function at a pressure well below the minimum operating inflation pressure of the bladders. In the use of this invention, it has been found that 65 p.s.i. is a satisfactory operating pressure for the switches.

Opening and closing of the mold is sensed by contact switch 25. Turn-over of the post cure inflator is detected by contact switch 26.

The press is controlled by circuitry located in control cabinet 30. A typical controller consists of the well known timer cam in which a number of cams are mounted on an extended shaft which is turned at a constant rate. A cycle of the press and post cure inflator is controlled by one full turn of the timer shaft. Cams on the shaft contact switches to operate the various press and inflator functions.

Figure 2:
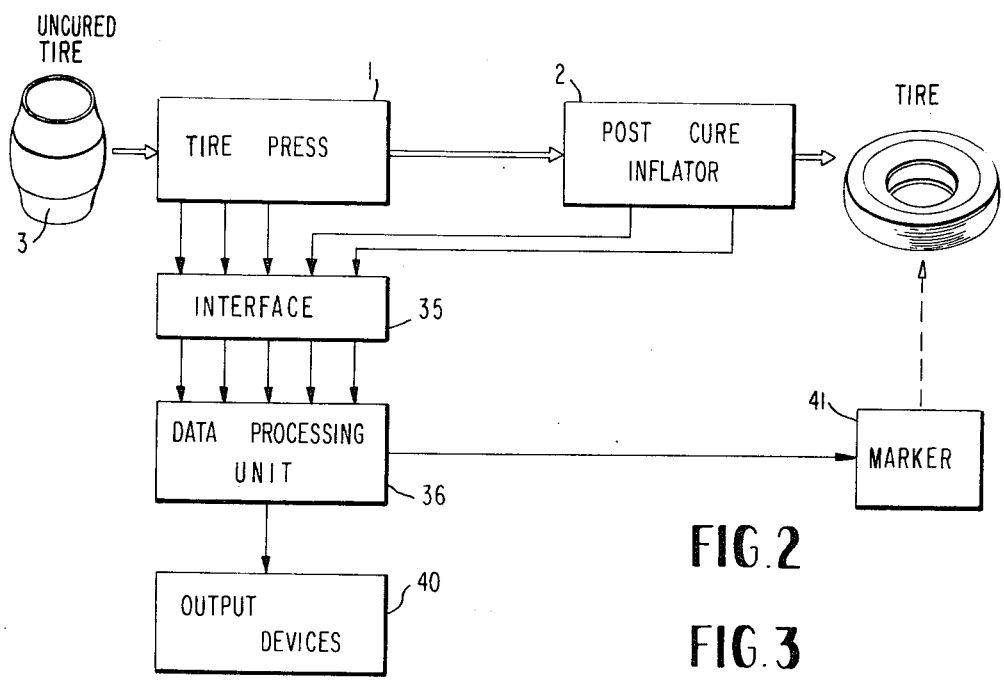
FIG. 2 is a block diagram of the apparatus according to this invention, incorporating a single tire press and post cure inflator.

FIG. 2 illustrates the combination of this invention including a single tire press and post cure inflator. It should be understood that any number of presses and inflators may be connected into the combination of FIG. 2 in parallel with the single units illustrated. Further, a post cure inflator will not be used in all applications to which this invention is used. In those cases where no post cure inflator is utilized, marker 41 marks tires as they emerge from press 1.

Signals generated during the operation of press 1 and inflator 2 are fed to interface circuit 35. The interface converts the signals to a voltage and form acceptable by the input terminals of data processing unit 36. Unit 36 performs comparisons between sensed data and stored data under control of a computer program which will be discussed in detail below.

A detailed explanation of the operation of data processing unit 36 will be given below. For the present, it is sufficient to understand the forms the various output signals may take. If the unit determines that sensed data lies without allowable ranges, it generates signals which cause output device 40, which may take the form of a printer, to print an exception message. This message states the problem, such as "overcure," and identifies the offending press cavity or post cure inflator stage. At the same time as the exception message is generated, marker 41 may be controlled to appropriately mark the overcured tire. For marking purposes, color coded paint sprays may be used. The color of the spray is determined by the degree of variance from predetermined standards. Depending on the variance, the spray may indicate a second or third grade tire or a tire which must be scrapped. Alternatively, marker 41 could magnetically or otherwise encode grade designations on strips carried by the tires. In this fashion, the tire could be machine sorted.

Operation of the steam pressure switches 21, 22 (FIG. 1) indicates that uncured tires have been loaded. Operation of the post cure inflator turn-over switch 26 (FIG. 1), absent an intervening exception message, indicates the production of acceptable tires. All such signals are loaded into memory in data processing unit 36 and retained until they are read out. At appropriate times, this data is read out to device 40 and transferred to another digital storage medium such as discs. Once on the discs, the data is printed out in a format under the control of a program not part of this invention. These production reports may be made available to supervisory personnel in a proper format whenever they are needed. As may be appreciated by anyone skilled in the art, output device 40 may take whatever form is needed to produce a desired output.

Figure 3:
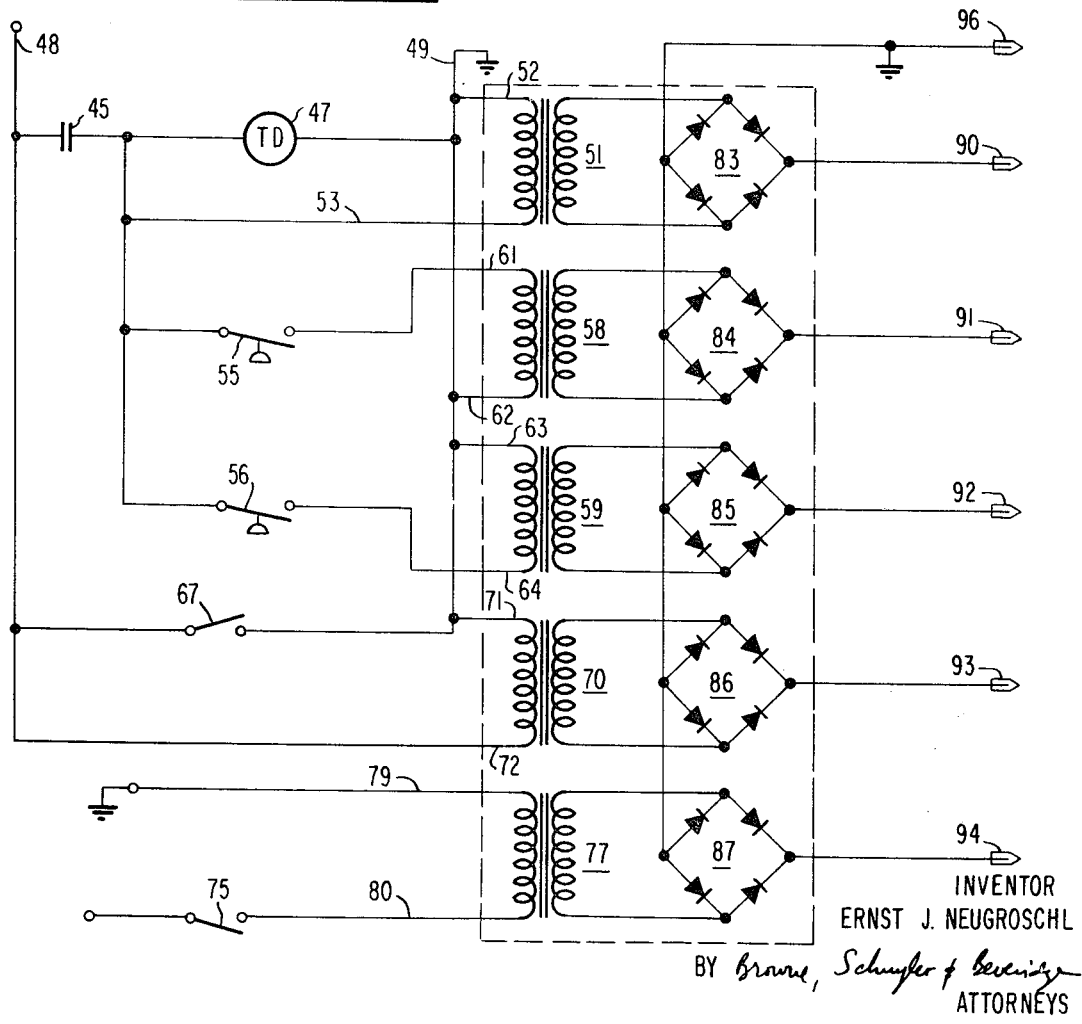
FIG. 3 is a schematic diagram of the interface circuit connecting each press with the input terminals of the data processing apparatus.

Interface circuit 35 is shown in detail in FIG. 3. Lines 48 and 49 are control circuit power lines already present in the control cabinet. Initiation of a cure cycle is accomplished by closing contacts 45 which turns on timer motor 47. During the time motor 47 operates, which is the length of a cure cycle, voltage is applied to the primary side of transformer 51 by lines 52, 53.

Contacts 55, 56 are operated by pressure switches 21, 22 (FIG. 1). When, following the initiation of a cure cycle, steam pressure rises above a predetermined value in bladders 5 (FIG. 1), contacts 55, 56 close, applying voltage to the primary side of transformers 58, 59 over lines 61, 62 and 63, 64.

Contact 67, operated by switch 25 (FIG. 1), is closed whenever the tire molds are closed. During the period when the molds are closed, voltage is applied across the primary of transformer 70 over lines 71, 72.

In those applications where post cure inflation is used, contact 75 is operated by the turn-over switch 26 (FIG. 1) on the post cure inflator. As above, voltage is applied across the primary of transformer 77 over lines 79, 80 whenever the post cure inflator accepts or discharges a tire pair.

Transformers 51, 58, 59, 70 and 77 step down whatever control circuit voltage is present to a level which may be connected to an intermediate interface or to the input terminals of the data processing unit, generally 24 volts. Since the data processing unit accepts only d. c. signals, full wave rectifiers 83, 84, 85, 86 and 87 convert the a.c. signal to d.c. in well known fashion. The d.c. voltages, representative of various curing process steps, are available between terminal plugs 90, 91, 92, 93 and 94 and the common line 96.

Data processing unit 36 must be capable of accepting data such as is generated by the sensing switches and interface 35. The unit utilized in this invention is the Model 1800 Data Aquisition and Control System manufactured by International Business Machines. Any equivalent system could be utilized with the appropriate program changes, where necessary.

In addition to the computer program, which is presented below, the data processing unit must be provided with the ranges of acceptable parameters for each tire type and rubber compound. These values are determined solely by the particular type and rubber involved and are not, therefore, set out here.

Parameters other than those set forth herein may be sensed and monitored. For example, temperature, in addition to pressure, of incoming steam may be monitored. Further, analog values of both temperature and pressure may be utilized rather than digital "on-off" signals.

The program set forth below accepts sensed data and compares it with the pre-stored acceptable parameters, as described above. By sensing the length of time a signal appears on the secondary of transformer 51, the length of the cure cycle is monitored and compared to predetermined acceptable values. The length of time signals appear on the secondaries of transformers 58 and 59 yield the pressure-on portion of the cure cycle, which is typically 5 percent shorter than the full cure cycle. In addition, signals from transformers 58 and 59 appear only when an uncured tire has been loaded into their corresponding tire cavity and may, therefore, be used also as production report data from each individual press cavity.

Opening of the tire mold is indicated by a signal on the secondary of transformer 70. Turn-over of the post cure inflator is indicated by a signal on the secondary of transformer 77. Data processing unit 36 translates the relative time of occurrence of these two signals into a time interval signal which is critical in the tire curing process. Finally, the turn-over signal, when there are no intervening exception messages, is interpreted as indicating two completed tires to add to the finished production count. An intervening exception message, which signals a failure in the process, causes the finished production count to remain unaffected by the appropriate number of tires.

Data manipulation by the data processing unit is under the control of the computer program. The program written in FORTRAN is set forth as follows. The instruction number is given immediately to the left of the FORTRAN instruction.

1 INTEGER SNAP(851)

2 EXTERNAL LOG

3 DIMENSION IZERO(112),IUNDR(112),IOVER(112),ISTAN(112),ISTAT(112)
1IDYNA(112),ITEST(112),ISAVE(112),MAB(112),
2JTEST(1170),
3ITRAC(112),NUTS(112),NUT1(66),NUT2(66)

4 DIMENSION MESS(224),MESS1(123),MESS2(96),MESS3(5)

5 COMMON/INSKEL/ICNT(325),IPR(60),MDTCT,ICHNG,ICHK,MSRCT,MWDAY,NLDCH
1(7),NPLCH(7),NBLCH(7),NLDCL(7),MACNO,
2ISCS(390),
3IDATE(3),IPSW5,MUD,JOE,IPETE,KPETE,NOODA,LSTEM,IHR(24),IJWK,IJMO,
4IBOTH,ISTOP,IPRT7,KHOUR,IPWK(2)

6 EQUIVALENCE (MAB(1),ITRAC(1))

7 EQUIVALENCE (NUTS(1),NUT1(1)),(NUTS(67),NUT2(1))

8 EQUIVALENCE(MESS(1),MESS1(1)),(MESS(124),MESS2(1)),(MESS(220),MESS
13(1))

9 EQUIVALENCE(SNAP(1),ICNT(1)),(SNAP(326),IPR(1)),(SNAP(386),MDTCT),
1(SNAP(387),ICHNG),(SNAP(388),ICHK),(SNAP(389),MSRCT),(SNAP(390),MW
2DAY),(SNAP(391),NLDCH(1)),(SNAP(398),NPLCH(1)),(SNAP(405),NBLCH(1)
3),(SNAP(412),NLDCL(1)),(SNAP(419),MACNO),(SNAP(420),ISCS(1)),(SNAP
4(810),IDATE(1)),(SNAP(813),IPSW5),(SNAP(814),MUD),(SNAP(815),JOE),
5(SNAP(816),IPETE),(SNAP(817),KPETE),(SNAP(818),NOODA)

10 EQUIVALENCE(SNAP(819),LSTEM),(SNAP(820),IHR(1)),(SNAP(844),IJWK),
1(SNAP(845),IJMP),(SNAP(846),IBOTH),(SNAP(847),ISTOP),(SNAP(848),IP
2RT7),(SNAP(849),KHOUR),(SNAP(850),IPWK(1))

11 DATA NMACH,IPRO1,ISTPP,MSTAT/112,40,390,18/

12 DATA ISTAN/112*1/

13 DATA NUT1/1,2,3,4,5,6,7,8,9,10,11,12,13,14,15,16,17,18,19,20,21,22
1,23,24,25,26,27,28,29,30,31,32,33,34,35,36,37,38,39,40,41,42,43,44
2,45,46,47,48,49,50,51,52,53,54,55,56,57,57,59,60,61,62,63,64,65,66
3/

14 DATA NUT2/67,68,91,92,93,94,95,96,97,98,99,100,101,102,103,104,105
1,106,107,108,109,110,111,112,69,70,71,72,73,74,75,76,77,78,79,80,8
21,82,83,84,85,86,87,88,89,90/

```
15    DATA MESS1/1,2,3,4,5,6,7,8,9,10,11,12,13,14,15,16,17,18,19,20,21,2
   12,23,24,25,26,27,28,29,30,31,32,33,34,36,35,38,37,40,39,42,41,44,4
   23,46,45,48,47,50,49,52,51,54,53,56,55,58,57,60,59,62,61,64,63,66,6
   35,68,67,69,70,71,72,73,74,75,76,77,78,79,80,81,82,83,84,85,86,87,8
   48,89,90,91,92,93,94,95,96,97,98,99,100,101,102,104,103,106,105,108
   5,107,110,109,112,111,114,113,116,115,118,117,120,119,122,121,124/
16    DATA MESS2/123,126,125,128,127,130,129,132,131,134,133,136,135,138
   1,137,140,139,142,141,144,143,146,145,148,147,150,149,152,151,154,1
   253,156,155,158,157,160,159,162,161,164,163,166,165,168,167,170,169
   3,172,171,174,173,176,175,178,177,180,179,181,182,183,184,185,186,1
   487,188,189,190,191,192,193,194,195,196,197,198,199,200,201,202,203,
   5,204,205,206,207,208,209,210,211,212,213,214,215,216,217,218,219/
      DATA MESS3/220,221,222,223,224/
17    DATA ITIMA,ITIMB,ITIMC/4,12,6/
18    DATA IBOTH,ILEFT,IRIGH/14,12,10/
19    DATA LSFT3,ISFT1,LSFT1,ISFT2,LSFT2,ISFT3/7000,7040,15000,15040,230
   100,23040/
20    DATA NWIRE,NWORD,NCALL,JTSTS,KSTPP/4,3,9,1170,13
21    DEFINE FILE 112(3,320,U,NSRS)
22    DEFINE FILE 18(5,224,U,LTD)
23    DEFINE FILE 49(10,160,U,MXI)
24    DEFINE FILE 499(10,160,U,MIX)
25    READ(MSTAT'1)ITRAC
26    JTST1=JTSTS-1
27    ICT=1
28    DO 20 IG=1,ISTPP,NWORD
29    CALL BITMN(ISCS(IG),4,0,JTEST(ICT),12)
30    CALL BITMN(ISCS(IG),4,4,JTEST(ICT+10),12)
31    CALL BITMN(ISCS(IG),4,8,JTEST(ICT+20),12)
32    CALL BITMN(ISCS(IG),4,12,JTEST(ICT+30),12)
33    CALL BITMN(ISCS(IG+1),4,0,JTEST(ICT+40),12)
34    CALL BITMN(ISCS(IG+1),4,4,JTEST(ICT+50),12)
35    CALL BITMN(ISCS(IG+1),4,8,JTEST(ICT+60),12)
36    CALL BITMN(ISCS(IG+1),4,12,JTEST(ICT+70),12)
```

```
37    CALL BITMN(ISCS(IG+2),4,0,JTEST(ICT+80),12)
38    IC=IC+1
39    ICT=ICT+NCALL*10
40    IF(IC-KSTPP) 20,19,19
41 19 ICT=ICT-JTST1
42    IC=0
43 20 CONTINUE
44    IC=0
45    DO 27 L=1,NMACH
46    JCT=NUTS(L)
47    DO 25 I=1,9
48    II=I+10*IC
49    IZERO(JCT)=IEOR(JTEST(II),JTEST(II+1))
50       IF(IZERO(JCT))26,25,26
51 25 CONTINUE
52    I=10
53 26 IZERO(JCT)=I
54 27 IC=IC+1
55    DO 80 L=1,NMACH
56    N=NUTS(L)
57    IF(ITRAC(N)-2)80,56,80
58 56 IK=N*2
59    K=10*(N-1)
60    WRITE(5,206)IK
61    DO 79 I=1,10
62    IN1=I+K
63 79 WRITE(5,208)JTEST(IN1)
64 80 CONTINUE
65    L=0
66    READ(MSTAT'2) IUNDR,IOVER
67    READ(MSTAT'3) ISTAT,IDYNA
68    READ(MSTAT'4) ITEST,ISAVE
69    READ(MSTAT'5) MAB,ISTAN
70 40 L=L+1
```

```
71      N=NUTS(L)
72      MACHR=MESS(2*N)
73      MACHL=MESS(2*N-1)
74      KAB=MAB(N)
75      GO TO(52,52,52,41),KAB
76   41 IF(JTEST(10*N)-IBOTH) 42,44,42
77   42 IF(JTEST(10*N)-ILEFT) 43,44,43
78   43 IF(JTEST(10*N)-IRIGH) 50,44,50
79   44 PRT7=IPRT7
80      IF(PRT7/.2-IPRT7/2)50,45,50
81   45 WRITE(5,209)N
82   50 IF(IPRT7-ITIMA)130,51,130
83   51 WRITE(5,203) MACHR,MACHL
84      GO TO 130
85   52 IF(IZERO(N)-10) 160,111,160
86  111 IF(JTEST(10*N)-IBOTH) 112,124,160
87  112 IF(JTEST(10*N)-ILEFT) 113,114,160
88  113 IF(JTEST(10*N)-IRIGH) 160,119,160
89  114 MAB(N)=2
90      IF(IPRT7-ITIMB)125,117,125
91  117 WRITE(5,201)MACHR
92      WRITE(7,201) MACHR
93      GO TO 125
94  119 MAB(N)=3
95      IF(IPRT7-ITIMC)125,122,125
96  122 WRITE(5,201)MACHL
97      WRITE(7,201) MACHL
98      GO TO 125
99  124 MAB(N)=1
100 125 IDYNA(N)=0
101     IF(ISTAT(N)-ISTAN(N)) 129,128,129
102 128 IOVER(N)=IOVER(N)+1
103 129 ISTAT(N)=ISTAT(N)+1
```

```
104 130 IF(L-NMACH) 40,140,140
105 140 IPRT7=IPRT7+1
106     L=0
107     CALL DATSW(5,IMJ)
108     IF(IMJ-1)149,800,149
109 800 WRITE(5,205)
110 142 L=L+1
111     N=NUTS(L)
112     MACHR=MESS(2*N)
113     MACHL=MESS(2*N-1)
114     IF(1-IUNDR(N))143,143,145
115 143 WRITE(5,204)MACHL,MACHR,IUNDR(N),IOVER(N)
116 144 IUNDR(N)=0
117     IOVER(N)=0
118     IF(N-NMACH)142,149,149
119 145 IF(1-IOVER(N))143,143,144
120 160 IDYNA(N)=IDYNA(N)+1
121     NN=IZERO(N)+1
122     ICC=N-1
123     DO 1260 KK=NN,10
124     II=KK+10*ICC
125     JT=JTEST(II)
126     IF(JT) 99,1161,1160
127 1160 GO TO(1161,99,99,99,99,99,1161,1161,1161,99,1161,99,1161,99),JT
128 1161 CALL BITST(JT,13,JLP)
129     CALL BITST(JT,14,JRP)
130     CALL BITST(JT,15,JMO)
131     IF(JLP+JRP-4) 1260,1165,1260
132 1165 IF(JMO-2) 1200,1170,1260
133 1260 CONTINUE
134 1290 IF(IDYNA(N)-1) 1300,1293,1300
135 1293 IZERO(N)=0
136     GO TO 163
137 1300 IZERO(N)=0
```

```
138         GO TO 130
139 1170 IF(ITEST(N)-2) 1175,1172,1172
140 1172 IF(IDYNA(N)-1) 1173,1175,1173
141 1173 ISAVE(N)=0
142         GO TO 1300
143 1175 ISAVE(N)=ISAVE(N)+1
144         ITEST(N)=1
145         IF(ISAVE(N)-5) 1260,1180,1260
146 1180 JB=MAB(N)
147         GO TO (1183,1181,1182,41),JB
148 1181 WRITE(5,1166) MACHL
149         GO TO 1260
150 1182 WRITE(5,1166) MACHR
151         GO TO 1260
152 1183 WRITE(5,1166) MACHL,MACHR
         DIMENSION IMARK(NMACH)
         IMARK(NMACH)=81
         CALL CO(11101,IMARK(1),IMARK(NMACH))
153         GO TO 1260
154 1200 IF(ITEST(N)-1) 1205,1205,1210
155 1205 ISAVE(N)=0
156 1210 ISAVE(N)=ISAVE(N)+1
157         ITEST(N)=2
158         IF(N-34) 1220,1220,1215
159 1215 IF(N-68) 1221,1221,1216
160 1216 IF(N-112) 1222,1222,130
161 1220 IF(ISAVE(N)-9) 1260,1225,1170
162 1221 IF(ISAVE(N)-8) 1260,1225,1170
163 1222 IF(ISAVE(N)-11)1260,1225,1170
164 1225 JB=MAB(N)
165         GO TO(1232,1230,1231,41),JB
166 1230 WRITE(5,207) MACHL
167         GO TO 1300
168 1231 WRITE(5,207) MACHR
```

```
169         GO TO 1300
170  1232   WRITE(5,207) MACHL,MACHR
171         GO TO 1300
172   99    WRITE(5,1267) N
173         GO TO 1260
174  163    JB=MAB(N)
175         GO TO (165,300,310,130),JB
176  165    ICNT(MACHL)=ICNT(MACHL)+1
177  310    ICNT(MACHR)=ICNT(MACHR)+1
178  168    ISTAN(N)=ISTAN(N)-1
179         IF(ISTAN(N)-ISTAT(N))170,170,169
180  169    IUNDR(N)=IUNDR(N)+1
181  170    ISTAT(N)=0
182         GO TO 130
183  300    ICNT(MACHL)=ICNT(MACHL)+1
184         GO TO 168
185  149    IF(IPRT7-IPRO1)150,150,141
186  141    IPRT7=0
187  150    WRITE(MSTAT'2)IUNDR,IOVER
188         WRITE(MSTAT'3)ISTAT,IDYNA
189         WRITE(MSTAT'4) ITEST,ISAVE
190         WRITE(MSTAT'5) MAB
191         IT=0
192         CALL CLOCK(IPSW)
193         IF(IPSW-LSFT3)218,216,211
194  211    IF(IPSW-ISFT1)216,216,212
195  212    IF(IPSW-LSFT1)218,216,213
196  213    IF(IPSW-ISFT2)216,216,214
197  214    IF(IPSW-LSFT2)218,216,215
198  215    IF(IPSW-ISFT3)216,216,218
199  216    IF(IPWK(2))175,217,175
200  217    CALL EONS
201         IPWK(2)=1
202         GO TO 175
```

```
203  218 IPWK(2)=0
204  175 CALL DATSW(3,IT)
205      IF(IT-1)177,176,177
206  176 WRITE(3,500)IPSW
207      WRITE(3,200)ICNT
208  177 IF(ISTOP-1) 1777,1778,1777
209 1777 WRITE(112'1) SNAP
210 1778 CALL CLOCK (IPSW5)
211      J=IPSW5/1000*1000
212      IREM=IPSW5-J
213      IF(IREM-483) 179,1780,1779
214 1779 IF(IREM-517) 1780,1780,179
215 1780 CALL QUEUE (LOG,23,1)
216  179 IF(ISTOP-2)) 181,180,181
217  180 CALL LEVEL(7)
218      ISTOP=3
219  181 CALL INTEX
220  200 FORMAT(' BAGOMATIC PRODUCTION',//,11(2015,//),415,//,'TIRE WATCH-
         1CASE',2(//,1915),//,'  GREEN TIRE PRODUCTION/MACHINE',2(//,2813))
221  201 FORMAT(1H , 'CAVITY',2X,I4,2X,'NOT CURING'/)
222  203 FORMAT(1H  'CAVT.',2X,2I4,2X,'DOWN-SET BY OPERATOR',/)
223  204 FORMAT(4(6X,I3))
224  205 FORMAT('  CAVITIES    UNDER AND OVER-CURES/SHIFT')
225  206 FORMAT(' CAVT. ',I3)
226  207 FORMAT(1H  'EXCESSIVE TIME BETWN CURES ON CAVIT',2X,I4,2X,I4,/)
227  208 FORMAT(2X,I2)
228  209 FORMAT('  IF MACHINE NO.',2X,I4,2X,'IS NOW AVAILABLE--RESET MAB C
         1ODE.'/)
229  500 FORMAT(I5)
230 1166 FORMAT('    OVERCURE CONDITION ON CAVIT',2X,I4,2X,I4,/)
231 1267 FORMAT('    ILLEGAL BIT CONFIGURATION ON MACH',2X,I4/)
232  210 END
```

As will be readily apparent to those skilled in the art, numerous modifications may be made in the disclosure herein without departing from the scope of this invention. Changes may be made in the manner in which process parameters are sensed and in the identity of the particular parameters without leaving the scope of this invention. While this invention has been described in combination with a steam bladder press, it is intended that the invention incorporate other types of presses, such as bladderless presses and bladder presses operated by hot water or air. Finally, as is realized by anyone skilled in the art, modifications in the computer program set forth herein may be made without changing the purpose or result of the program. It is intended that the invention be limited only by the following claims.

What is claimed is:

1. In a system for manufacturing tires, the combination of a plurality of tire molding and curing apparatuses, each molding and curing apparatus having with it, means for determining the times of occurrence of discrete selected process conditions during the molding and curing of tires in said apparatus, means for generating signals at each of said times, and data processing means comprising, means at said data processing means for receiving and repetitively scanning said generated signals associated with said plurality of apparatuses, respectively;

means for translating said scanned signals from said plurality of apparatuses into second signals corresponding to selected time intervals of critical importance in the molding and curing process, means for comparing said second signals corresponding to selected time intervals to stored reference data, and output means responsive to said means for comparing for generating an output signal for each tire produced and making a record of said comparison, said output signal and record being dependent upon said comparisons between said signals corresponding to selected time intervals and said stored reference data.

2. In a system for manufacturing tires, the combination of, tire molding and curing apparatus comprising a tire curing press and tire post cure inflator, said press having a tire mold in which a tire is molded by a means for applying pressure to the inside of the tire which forces the outside of the tire against the mold, means for sensing process parameters during the molding and curing of a tire in said apparatus and generating signals corresponding thereto, said sensing means comprising, means for sensing the beginning and end of a tire curing cycle of a tire in said tire press, means for sensing the rise and fall of said pressure above a selected value, means for sensing the time of opening and time of closing of the mold in said tire press, means for sensing the time of operation of said post cure inflator, data processing means, connected to said sensing means to receive said signals from each of said means for sensing, for comparing data contained therein with stored reference data corresponding to selected allowable process parameter values, said data processing means comprising means for receiving and translating selected ones of said sensed parameter signals into signals corresponding to selected time intervals of critical importance in tire molding and curing, means for comparing said translated signals and the sequence thereof with stored reference values and a stored sequence and output means responsive to said means for comparing for generating an output signal for each tire produced and making a record of said comparison, said output signal and record being dependent upon said comparisons.

* * * * *